No. 886,222. PATENTED APR. 28, 1908.
H. S. KOINER & S. BOTTEESE.
REMOVABLE SUPPORT FOR VEHICLE CURTAINS.
APPLICATION FILED OCT. 12, 1907.
3 SHEETS—SHEET 1.
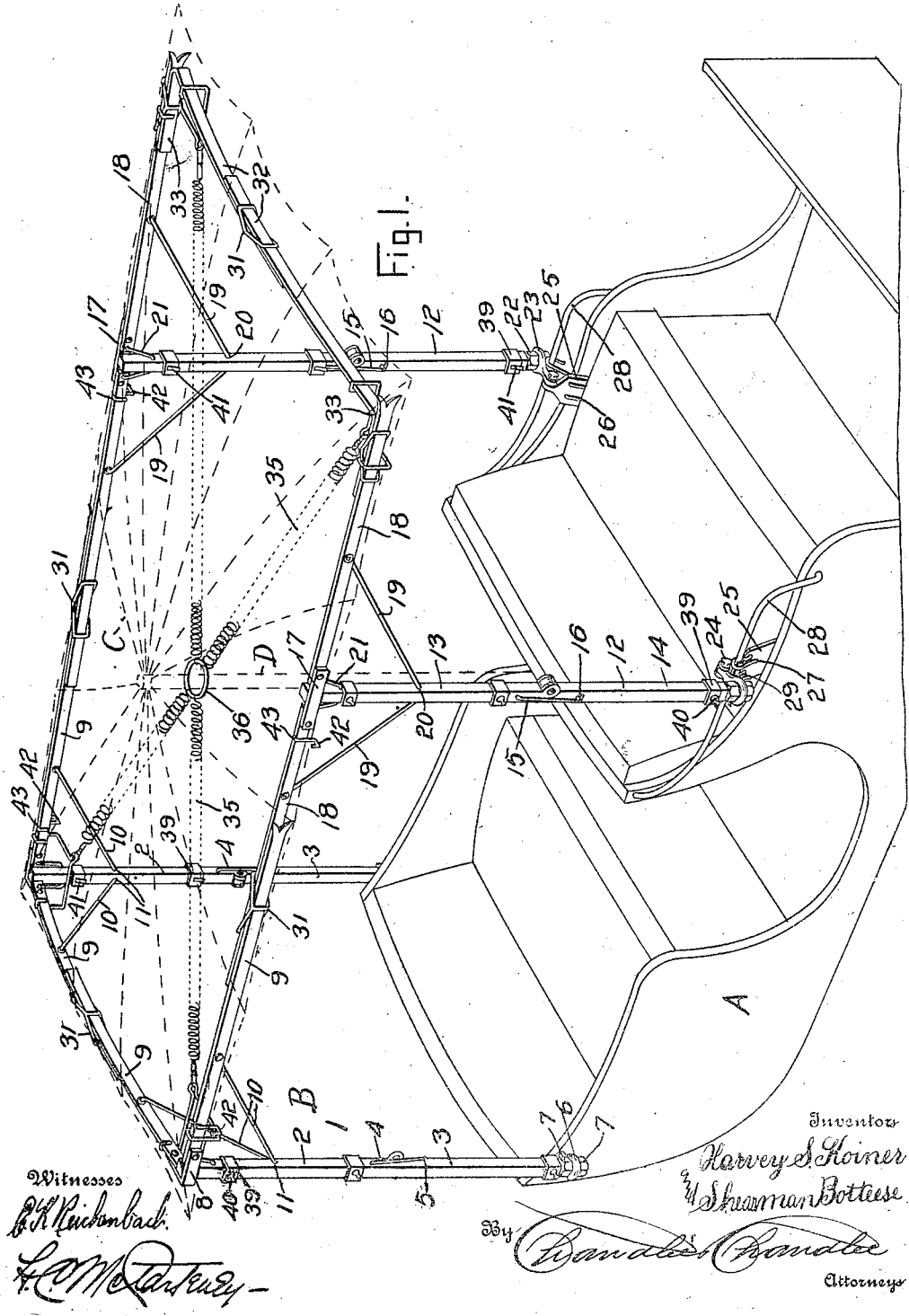

No. 886,222. PATENTED APR. 28, 1908.
H. S. KOINER & S. BOTTEESE.
REMOVABLE SUPPORT FOR VEHICLE CURTAINS.
APPLICATION FILED OCT. 12, 1907.
3 SHEETS—SHEET 2.
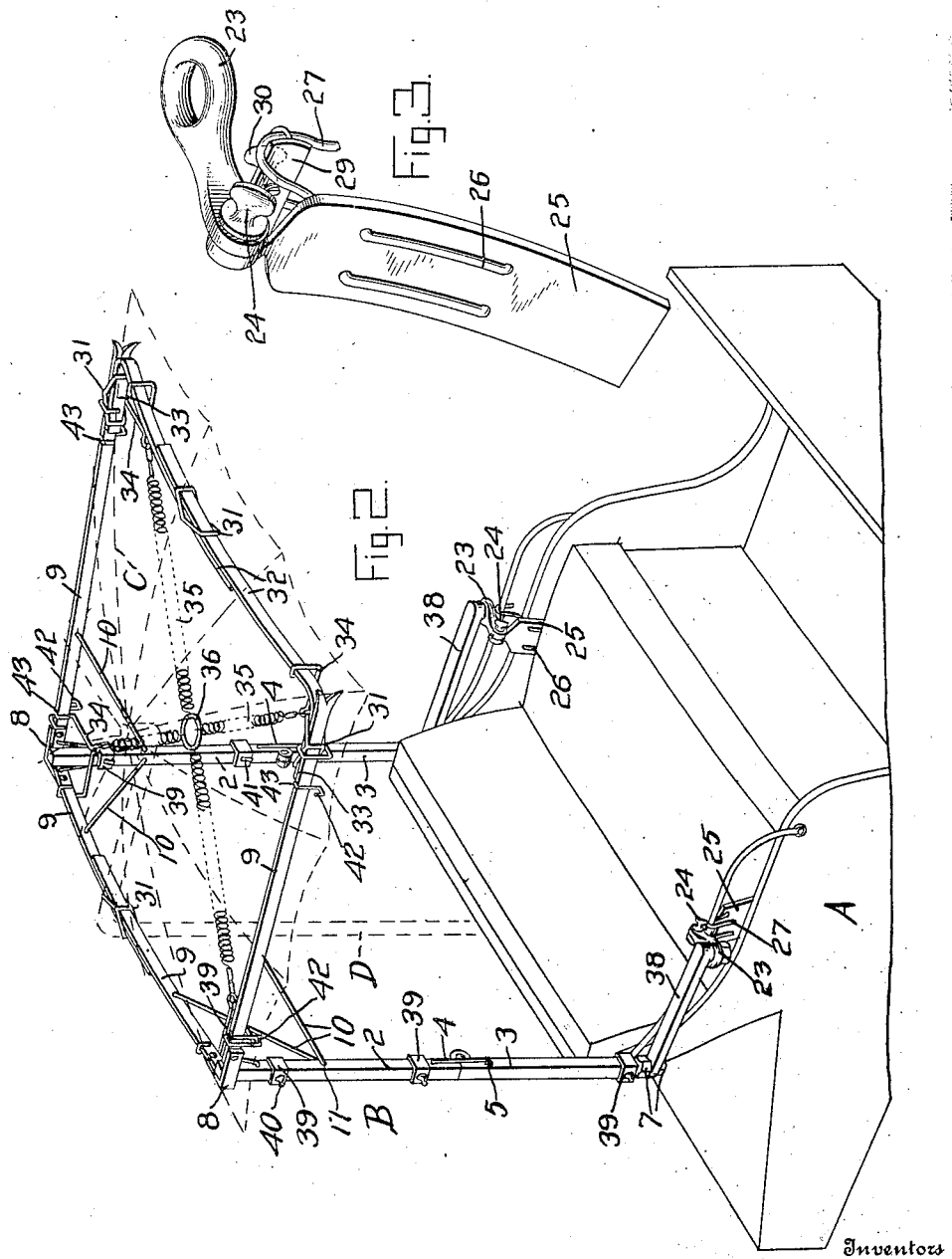
Witnesses
Inventors
Harvey S. Koiner.
Sharman Botteese.
By Chandler & Chandler
Attorneys

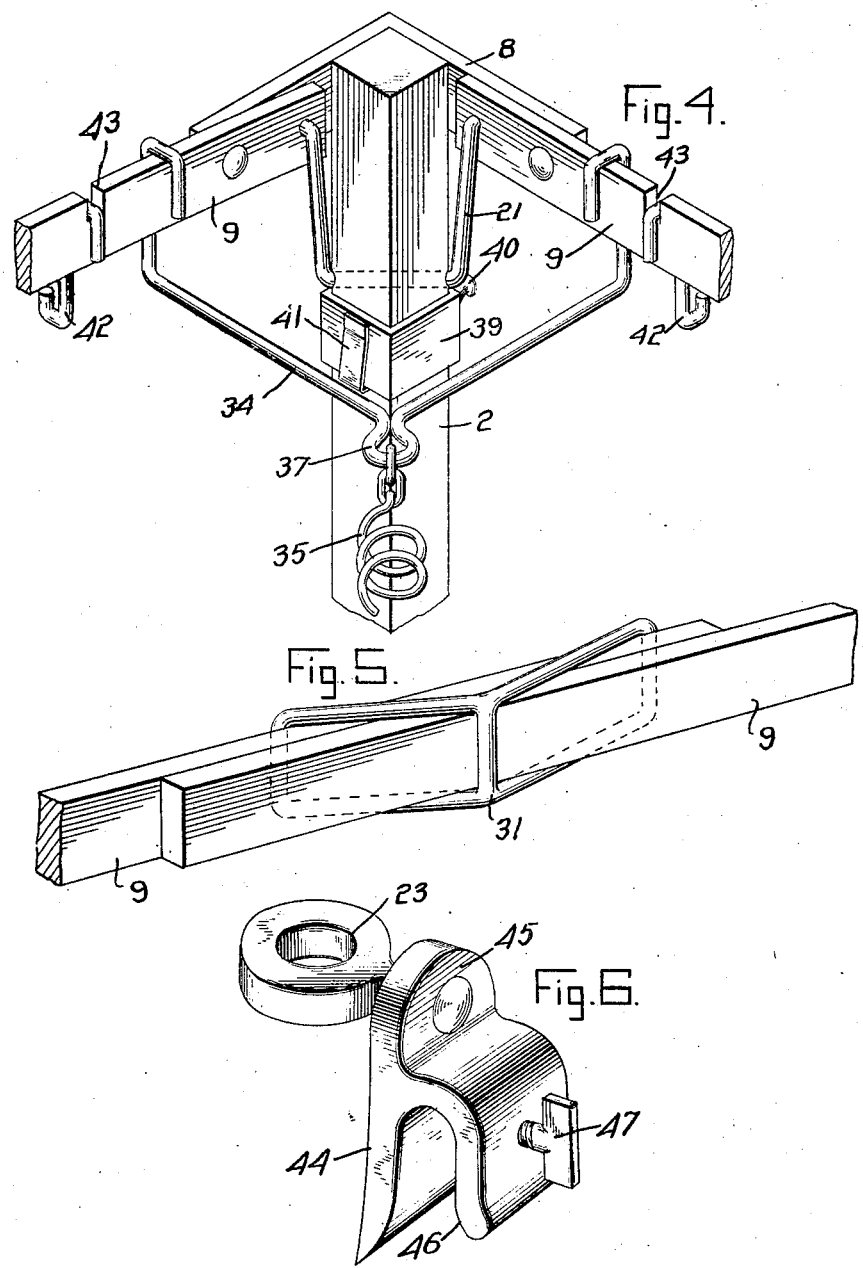

UNITED STATES PATENT OFFICE.

HARVEY S. KOINER AND SHEARMAN BOTTEESE, OF WASHINGTON, DISTRICT OF COLUMBIA.

REMOVABLE SUPPORT FOR VEHICLE-CURTAINS.

No. 886,222.  Specification of Letters Patent.  Patented April 28, 1908.

Application filed October 12, 1907. Serial No. 397,227.

*To all whom it may concern:*

Be it known that we, HARVEY S. KOINER and SHEARMAN BOTTEESE, citizens of the United States, residing at Washington, in the District of Columbia, have invented certain new and useful Improvements in Removable Supports for Vehicle-Curtains; and we do hereby declare the following to be a full, clear, and exact description of the invention, such as will enable others skilled in the art to which it appertains to make and use the same.

The present invention has reference to removable supports for vehicle curtains, and it aims, generally, to provide an exceedingly simple, durable, and inexpensive curtain-supporting frame work which may be readily attached to and removed from the body of any light vehicle of that class and which is formed of a number of detachable sections, the members of which are pivotally connected to each other so as to permit of their being folded together, it being thus possible to dispose the entire structure when not in use, beneath one of the seats or at the back of the vehicle.

The invention further resides in the provision of a frame work of the type above referred to in which the top portion thereof is adapted to be connected with the pole of the umbrella cover with which such vehicles are usually provided.

The invention still further consists in the specific construction of the several sections of the frame, and in the manner in which said sections and the members thereof are connected together, this construction being hereinafter described in detail and illustrated in the accompanying drawings in which latter, like parts or features as the case may be, are designated by corresponding reference characters in the several views.

Of the said drawings, Figure 1 is a perspective view of the invention applied to a two-seated carriage. Fig. 2 is a similar view of the invention applied to a vehicle having a single seat. Fig. 3 is an enlarged perspective view of one of the clamps. Fig. 4 is a fragmental perspective view of one of the main posts showing the angle-iron carried thereby, the wings pivoted to the iron, and the clip secured to the wings. Fig. 5 is a perspective view of one of the buckles for connecting the wings of the adjacent sections together. Fig. 6 is a perspective view of a modified form of clamp.

Referring to the drawings, and more particularly to Fig. 1, A generally designates the carriage; B the curtain-supporting frame work, forming the subject of this invention; and C the umbrella, whose pole D is secured to the front seat by a clamp of any ordinary description. In the form of the invention shown in this figure the rear or main posts 1, which are disposed upon opposite sides of the rear seat are each composed of an upper section 2 and a lower section 3 hinged together at their inner ends and further connected at such point by a U-shaped latch 4 which is pivoted at its upper end, or bight portion, in an opening formed through the section 2, the arms of the latch having their ends adapted for engagement with pins 5 carried by the section 3. The threaded lower end of each post section extends through the eye portion of a bolt 6, and carries a pair of nuts 7 which contact with opposite sides thereof, the sections being held in position by means of said bolts whose stems are embedded in the seat sides, the position of the nuts limiting the extent to which the section ends pass through the bolt eyes. The upper section 2 of each main post carries at its upper end an angle-iron 8 each arm of which has pivoted thereto a wing 9 which, in its raised position forms one of the members of the top of the frame work, the wings being retained in such position by means of braces 10 which are pivoted at one end thereto, the opposite end of each brace fitting in a socket 11 formed in the post section, this construction enabling both the wings and their braces to be folded directly against the sides of the post when not in use.

The front posts 12, which are made use of when the carriage includes two seats, are likewise jointed as shown in Fig. 1, and comprise each an upper section 13 and a lower section 14 hinged together at their mutually-adjacent ends and held in operative position by latches 15 and pins 16 similar to those already described. The upper section 13 of each of the front posts has secured to its free end a horizontal metal crosspiece or strap 17 to each end of which a wing 18 is pivoted, the wings carrying braces 19 similar to the braces 10, the post sections being provided with sockets 20 for the reception of the lower ends of the braces.

The several wings 9 and 18 may be further supported when in raised position, by swinging U-shaped wire clips 21, the outbent ends of whose arms are adapted for engagement in perforations formed in the wings at their ends, the central portion of each clip fitting loosely in a transverse opening formed through the corresponding post section, the clip arms thus straddling the latter, as shown.

The threaded lower end of each post section 14 likewise carries a pair of nuts 22 which rest against an eye link or bolt 23 loosely mounted upon the stem of a set screw 24 which passes through the twisted upper end of a metal strap 25 disposed against the inner face of the corresponding seat side, each strap carrying a U-shaped spring wire clip 26 whose arms pass through openings formed in the strap and have their free ends bent downwardly so as to form hooks 27 adapted for engagement with the rods 28 secured to the seat sides, upon which rods the bolts 23 rest, the section ends passing through the eye portions of the latter. The bolts are adapted to be held in adjusted position by means of flanges which are formed on the set-screws.

If desired, an additional plate 29 may be used in connection with the hooks 27, as shown in Fig. 3, this plate being secured to said hooks and provided with a set-screw 30 whose end impinges against the adjacent rod 28.

The adjacent wings of the posts at each side of the carriage overlap each other, as shown in Fig. 1, and are held together at such point by means of buckles 31 through the two members of which the wings extend, this construction permitting the posts to be disposed at varying distances from each other, according to the size of the carriage, a similar connection being provided for the back wings of the two rear posts, which wings form the back member of the frame top. The forward member of the frame top consists of a pair of wings 32 whose mutually-adjacent inner ends are connected by buckles similar to those already described, the outer end of each of the last-mentioned wings being bent at right angles to the body thereof, as indicated by the numeral 33, such end being adapted to fit against the forward end of the corresponding wing 18 and to be likewise connected therewith by a buckle, it being possible therefore, to adjust the frame work to carriages of various widths by merely moving the rear wings 9 and the front wings 32 towards or from each other.

At each of its four corners the frame top carries a V-shaped wire clip 34 which extends normally towards the center of the frame and is connected with a pair of links secured to one end of a spring 35 whose opposite end is secured to a ring 36 through which the pole D of the umbrella C is passed, the latter being disposed above the frame top, as shown in dotted lines in Figs. 1 and 2 and extending beyond the same. The apex of each clip is provided with an eye 37 in which the links are made fast, while the free end of the clip arms are bent upwardly and hooked upon the adjacent wings, as shown in Fig. 4.

In the single seated carriage shown in Fig. 2, the main or rear posts only are made use of, the lower end of each post carrying a forwardly-extending arm 38 pivoted thereto at its rear end and held in place by nuts arranged on opposite sides thereof, the forward end of each arm being formed with a depending finger which extends through the eye portion of the adjacent bolt 23 which is carried by the strap 25 as above described, and is provided with a retaining nut.

Each of the posts made use of carries a series of collars 39 provided with buttons 40 adapted to be passed through the corresponding button holes in the side edges of the curtains (not shown), the collars being held in adjusted position upon the post by means of spring tongues 41 secured at one end thereof and having their opposite ends serrated. The curtains are secured at their upper edges to the frame work by wire hooks 42 which are suspended from the wings and have their bent ends fitted in notches 43 formed therein.

From the foregoing description, it will be apparent that the curtains may be readily fastened to and removed from the frame work, and that the latter itself, by reason of its sectional construction may likewise be quickly attached to and removed from the body of the carriage, the joint formation of the sections or members of the frame work permitting the same to be folded together when not in use, so as to occupy but little space. It will also be apparent that the overlapping of the wings which form the top of the frame enable the device to be adjusted for use upon carriages of various sizes. Two additional posts with pivoted braces for each additional seat can be used, where the umbrella is of sufficient size. The entire device, moreover, can be manufactured at a very slight cost.

It is not essential that both the braces 10 or 19 and the clips 21 be used, as either alone will serve to support the wings.

The modified form of clamp shown in Fig. 6 comprises a U-shaped member whose inner arm 44 is provided at its upper end with an extension 45 in which the stem of the eye bolt 23 is swiveled, while its opposite arm 46 carries a set-screw 47 whose inner end is adapted to impinge against the upper end of the seat side on opposite sides of which the clamp arms are disposed.

What is claimed is:

1. In a curtain supporting frame for carriages, the combination of a post; a cross-piece secured to the upper end thereof; a wing pivoted to each end of the cross-piece and movable into and out of horizontal position; and a U-shaped retaining clip pivoted to the post and having the free ends of its arms adapted for engagement with the wings when the latter are in horizontal position.

2. In a curtain supporting frame for carriages, the combination of a post; a cross-piece secured to the upper end thereof; a wing pivoted to each end of the cross-piece and provided at its inner end with a perforation, said wings being movable into and out of horizontal position; and a U-shaped retaining clip pivoted to the post, the free ends of each clip arm being adapted for engagement with the perforated end of the corresponding wing when the latter is in horizontal position.

3. In a curtain supporting frame for carriages, a foldable post comprising an upper and a lower section hinged together; a pair of wings pivotally connected to the upper section and movable into and out of horizontal position; retaining clips carried by said section and adapted for engagement with the wings when the latter are in horizontal position; and a brace pivoted to each wing and adapted for engagement with the upper section when said wings are in such position.

4. In a curtain supporting frame for carriages, a foldable post comprising an upper and a lower section hinged together, the upper section being socketed; a cross-piece secured to the upper section; a wing pivoted to each end of the cross-piece and movable into and out of horizontal position, each wing being provided at its inner end with a perforation; a U-shaped retaining clip pivoted to the upper section and having the free ends of its arms adapted for engagement with the perforated ends of the corresponding wings, when the latter are in horizontal position; and a brace pivoted to each wing and having its free ends adapted for engagement in the corresponding socket in the post, when the wings are in such position.

5. In a device of the class described, the combination, with an umbrella and its supporting pole, of a curtain-supporting frame comprising an open rectangular top and supporting posts therefor; a clip connected to each corner of the top; and a series of coil-springs connected at their outer ends with said clips and at their inner ends to a ring through which the umbrella pole is adapted to pass.

6. In a curtain supporting frame for carriages, the combination of a vertical post, and a detachable connection between the post and the body of the carriage composed of a strap provided with a twisted upper end, an eye-bolt pivotally connected with said end and adapted to receive the lower end of the post, and a wire clip fastened to the strap and adapted for engagement with the carriage body.

7. In a curtain supporting frame for carriages, the combination of a vertical post, and a detachable connection between the post and the body of the carriage composed of a strap provided with a twisted upper end, an eye-bolt pivotally connected with said end and adapted to receive the lower end of the post, and a U-shaped wire clip fastened to the strap and having the free ends of its arms hooked for engagement with the carriage body.

8. In a curtain supporting frame for carriages, the combination of a vertical post, and a detachable connection between the post and the body of the carriage composed of a strap provided with a twisted upper end having an opening formed therethrough, a set screw passing through said opening, an eye-bolt pivoted to the stem of the set screw and adapted to receive the lower end of the post, and a clip carried by the strap and adapted for engagement with the carriage body.

9. In a curtain supporting frame for carriages, the combination of a vertical post, and a detachable connection between the post and the body of the carriage composed of a strap provided with a twisted upper end having an opening formed therethrough, a set screw passing through said opening, an eye-bolt pivoted to the stem of the set screw and adapted to receive the lower end of the post, and a U-shaped wire clip fastened to the strap and having the free ends of its arms hooked for engagement with the carriage body.

In testimony whereof, we affix our signatures in presence of two witnesses.

HARVEY X S. KOINER.
his mark
SHEARMAN BOTTEESE.

Witnesses:
M. T. MILLER,
S. R. BRATTAN.